(12) United States Patent
Du et al.

(10) Patent No.: US 7,876,454 B2
(45) Date of Patent: Jan. 25, 2011

(54) METHOD AND SYSTEM FOR MEASUREMENT OF A CUTTING TOOL

(75) Inventors: Xiaoming Du, Shanghai (CN); Kevin George Harding, Niskayuna, NY (US); Steven Robert Hayashi, Niskayuna, NY (US); Tian Chen, Shanghai (CN); Jianming Zheng, Shanghai (CN); Howard Paul Weaver, Mason, OH (US); James Allen Baird, Amelia, OH (US); Xinjue Zou, Shanghai (CN)

(73) Assignee: General Electric Company, Niskayuna, NY (US)

( * ) Notice: Subject to any disclaimer, the term of this patent is extended or adjusted under 35 U.S.C. 154(b) by 295 days.

(21) Appl. No.: 12/240,295

(22) Filed: Sep. 29, 2008

(65) Prior Publication Data

US 2009/0067704 A1    Mar. 12, 2009

Related U.S. Application Data

(63) Continuation-in-part of application No. 11/642,076, filed on Dec. 20, 2006, now Pat. No. 7,768,655.

(51) Int. Cl.
  *G01B 11/24* (2006.01)
(52) U.S. Cl. .................................... 356/601; 356/607
(58) Field of Classification Search ......... 356/601–602, 356/607–608, 614–615, 431, 2, 3, 9, 15–18, 356/237.1–237.5; 250/559.22, 559.23, 221, 250/236, 559.27, 559.4, 559.44, 559.19
See application file for complete search history.

(56) References Cited

U.S. PATENT DOCUMENTS

| | | | |
|---|---|---|---|
| 3,692,414 A | 9/1972 | Hosteman et al. | |
| 3,710,128 A | 1/1973 | Kubisiak | |
| 4,583,854 A | 4/1986 | Lozar | |
| 4,736,247 A | 4/1988 | Graham et al. | |
| 4,745,290 A | 5/1988 | Frankel et al. | |
| 4,966,460 A | 10/1990 | Kahley | |

(Continued)

FOREIGN PATENT DOCUMENTS

EP    1580521 A2    9/2005

(Continued)

OTHER PUBLICATIONS

G F Dalgleish et al., "Laser-based inspection of cutting tools for advanced manufacturing systems," Factory 2000—Advanced Factory Automation, Conference Publication No. 398, IEE 1994, Oct. 3-5, 1994, pp. 502-508.

(Continued)

*Primary Examiner*—Gregory J Toatley
*Assistant Examiner*—Tri T Ton
(74) *Attorney, Agent, or Firm*—Penny A. Clarke

(57) ABSTRACT

A method for measurement of a cutting tool is provided. The method comprises positioning the cutting tool on a moveable stage, performing a first rotary scan of a first section of the cutting tool to generate a first scanning point cloud, segmenting the first scanning point cloud, performing a second rotary scan of the first section based on the segmentation of the first scanning point cloud, and extracting the parameters of the first section based on the second rotary scan of the first section. A system for extracting parameters of a cutting tool is also presented.

20 Claims, 3 Drawing Sheets

U.S. PATENT DOCUMENTS

| | | |
|---|---|---|
| 5,477,371 A | 12/1995 | Shafir |
| 5,568,260 A | 10/1996 | Schneiter |
| 5,570,186 A | 10/1996 | Satzger et al. |
| 5,708,279 A | 1/1998 | Cheng |
| 5,846,081 A | 12/1998 | Bushway |
| 6,788,807 B1 | 9/2004 | Norita et al. |
| 6,927,863 B2 | 8/2005 | Gurny |
| 7,027,145 B2 | 4/2006 | Segall et al. |
| 2002/0154396 A1 | 10/2002 | Overbeck |
| 2004/0263863 A1 | 12/2004 | Rogers et al. |
| 2007/0124015 A1 | 5/2007 | Chen et al. |
| 2008/0148590 A1 | 6/2008 | Hayashi et al. |

OTHER PUBLICATIONS

EP1580521 Abstract, Sep. 28, 2005.

METHOD AND SYSTEM FOR MEASUREMENT OF A CUTTING TOOL

CROSS REFERENCE TO RELATED APPLICATIONS

This application is a continuation-in-part application of U.S. patent application Ser. No. 11/642,076, filed Dec. 20, 2006, the contents of which are hereby incorporated by reference.

BACKGROUND

This invention relates generally to methods and systems for measurement of objects. More particularly, this invention relates to methods and systems for measurement of cutting tools.

Various types of cutting tools are known and used for machining objects, such as engine blades. Each cutting tool has associated parameters, such as primary relief angle, flute spacing, rake angle and so forth, to define a shape and a profile thereof. Typically, performance of the machined objects may depend on the parameters of the cutting tools. Accordingly, inspection of the cutting tools is required from time-to-time to ensure a desired performance of the cutting tools. In general, the parameters associated with the cutting tools are estimated and compared to desired values for determining the cutting performance of the cutting tools.

Different measurement methods for the cutting tools are employed to determine the parameters of such cutting tools. For example, the cutting tools are sliced and an optical comparator or a hard gage is employed to measure the parameters at any section of the sliced cutting tools. However, this technique requires physical slicing of the cutting tools, thereby making them unusable for future machining. In addition, certain methods employ image-processing techniques for estimating the tool parameters from captured projections. However, such measurement methods are limited to estimation of a minority of the tool parameters and are unable to provide measurements for all of the parameters associated with the cutting tools. Further, existing parameter measurement techniques for the cutting tools are time-consuming, relatively expensive and are less accurate than desired.

Therefore, there is a need for a new and improved method for extraction of parameters of cutting tools.

BRIEF DESCRIPTION

A method for measurement of a cutting tool is provided in accordance with one embodiment of the invention. The method comprises positioning the cutting tool on a moveable stage, performing a first rotary scan of a first section of the cutting tool to generate a first scanning point cloud, segmenting the first scanning point cloud, performing a second rotary scan of the first section based on the segmentation of the first scanning point cloud, and extracting the parameters of the first section based on the second rotary scan of the first section.

Another embodiment of the invention further provides a system for measurement of a cutting tool. The system comprises a stage configured to position the cutting tool, a range sensor configured to scan the cutting tool and a controller. The controller is configured to control the range sensor to perform a first rotary scan of a first section of the cutting tool to generate a first scanning point cloud and segment the first scanning point cloud, and further to control the range sensor to perform a second rotary scan of the first section based on the segmentation of the first scanning point cloud to extract the parameters of the first section.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

Embodiments of the present disclosure will be described hereinbelow with reference to the accompanying drawings. In the subsequent description, well-known functions or constructions are not described in detail to avoid obscuring the disclosure in unnecessary detail.

Figure 1:
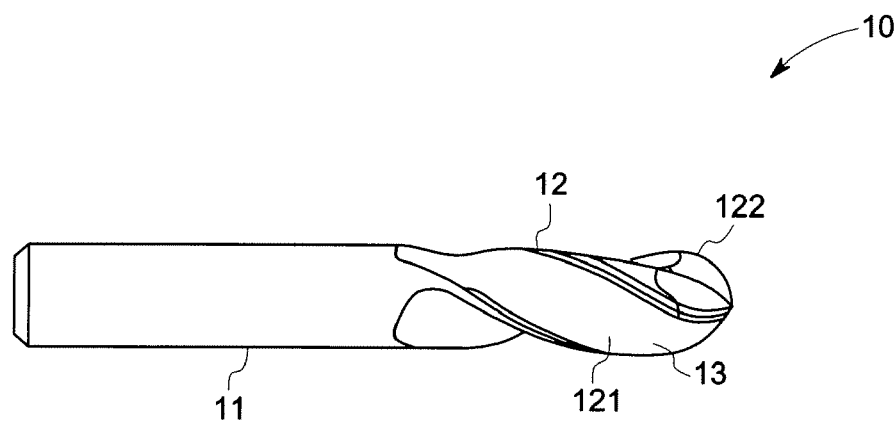
FIG. 1 is a perspective view of an example cutting tool.

In embodiments of the invention, parameters of different types of cutting tools, such as ball end mills, flat end mills, drills and reamers may be extracted. Referring to FIG. 1, a cutting tool 10, such as a ball end mill is illustrated. It should be noted that the invention is not limited to any particular type of cutting tool. Rather, the example depicted in FIG. 1 is merely illustrative. The cutting tool 10 comprises a shank 11 and a cylindrical cutting body 12. The cutting body 12 comprises a side portion 121 and a tip 122. In the illustrated example, the tip 122 comprises a rounded tip. For other cutting tools, the tip 122 may comprise other shapes, such as a flat tip when the cutting tool 10 comprises a flat end mill.

In the illustrated example, the cutting body 12 comprises multiple cutting edges and multiple flutes 13 based on a desired profile of machined parts. In one example, a two-flute mill may be employed for cutting slots or grooves. A four-flute mill may be used for a surface milling operation. The cutting tool 10 has a plurality of parameters associated with the cutting body 12. Non-limiting examples of the parameters comprise flute spacing, an axial primary relief angle, a radial primary relief angle, a radial rake angle, concentricity, a core diameter, an axial rake angle, and a helix angle, for the illustrated example.

Figure 2:
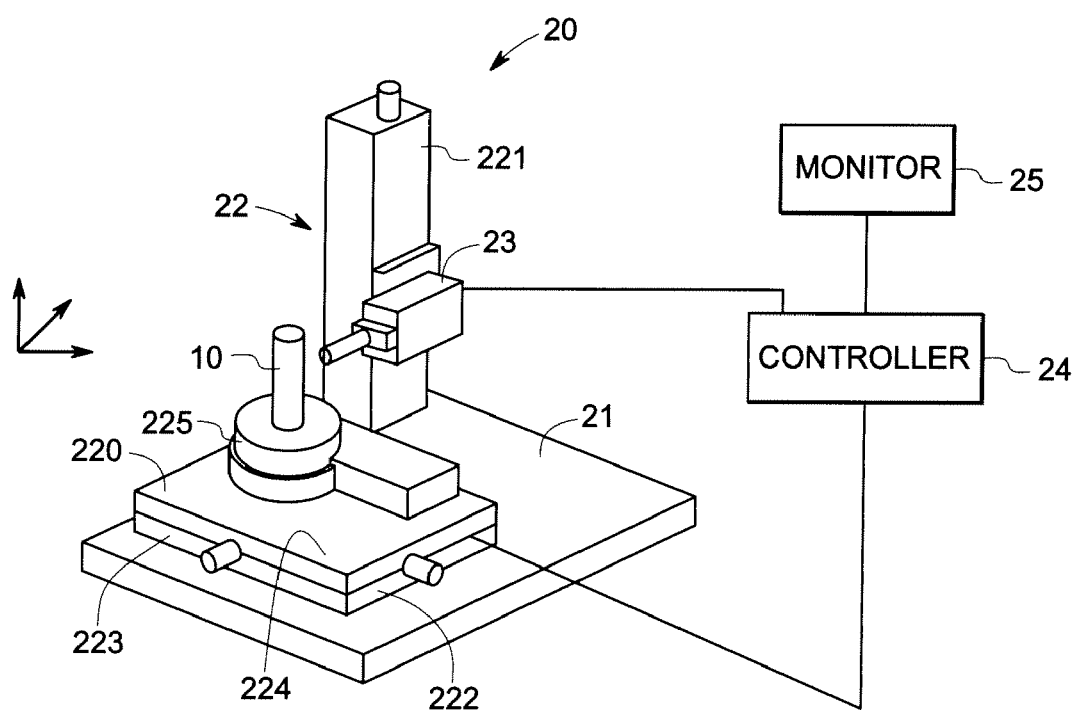
FIG. 2 is a schematic diagram of a measurement system for measuring the cutting tool in accordance with one embodiment of the invention.

FIG. 2 is a schematic diagram of a measurement system 20 for extracting the parameters of the cutting tool 10 in accordance with one embodiment of the invention. As illustrated in FIG. 2, the measurement system 20 comprises a base 21, a stage 22, a range sensor 23, and a controller 24. In the illustrated embodiment, the stage 22 comprises a first stage 220 and a second stage 221. The first stage 220 is moveably disposed on the base 21 and comprises a positioning element 222 comprising a bottom element 223 and an upper element 224 stacked together. In one embodiment, the bottom element 223 and the upper element 224 may move along an X-axis and a Y-axis relative to the base 21, respectively. Additionally, the first stage 220 may further comprise a rotatable element 225 rotatably disposed on the upper element 224 for holding the cutting tool 10. Accordingly, the cutting tool 10 may move along the X-Y-axis and rotate about a Z-axis relative to the base 21 with the linear movement of the positioning element 222 and rotation of the rotatable element 225.

In one non-limiting example of the invention, the first stage 220 may move along the X-axis within a range of approximately zero millimeters to approximately fifty millimeters with a resolution of approximately 0.1 micrometers, and may move along the Y-axis within a range of approximately zero millimeters to approximately one hundred millimeters with a resolution of approximately 0.1 micrometers. In other embodiments, the first stage 220 may move along the X-axis and/or the Y-axis within other suitable ranges having any suitable resolution. Additionally, the rotatable element 225 may rotate approximately 360 degree with a resolution of approximately 0.0001 degrees. Alternatively, the rotatable element 225 may rotate within other suitable ranges with other suitable resolutions.

In the illustrated embodiment, the second stage 221 is fixedly disposed on the base 21 to moveably hold the range sensor 23 and adjacent to the first stage 220. In one example, the range sensor 23 may move on the second stage 221 along the Z-axis. In more particular examples, the range sensor 23 may move along the Z-axis within a range of approximately zero millimeters to approximately 250 millimeters with a resolution of approximately 0.1 micrometers. In other embodiments, the range sensor 23 may move along the Z-axis within other suitable ranges and with other suitable resolutions.

In certain embodiments, the range sensor 23 may also move on the second stage 221 along the X-axis and Y-axis within a range and with a resolution substantially similar to these of first stage 220. In other embodiments, the second stage 221 may be moveably disposed on the base 21. Accordingly, in embodiments of the invention, the controller 24 may control the first stage 220 and the second stage 221 to cooperate to position the range sensor 23 at variable distances from the cutting tool 10 to measure the points on the cutting tool 10.

In the illustrated embodiment, the controller 24 comprises at least one of a computer, a database, and/or a processor to control the movement of the stage 22 and the range sensor 23, and to store and analyze the measured data points from the range sensor 23. It should be noted that the present invention is not limited to any particular computer, database or processor for performing the processing tasks of the invention. The term "computer", as that term is used herein, is intended to denote any machine capable of performing the calculations, or computations, necessary to perform the tasks of the invention. The term "computer" is intended to denote any machine that is capable of accepting a structured input and of processing the input in accordance with prescribed rules to produce an output. It should also be noted that the phrase "configured to" as used herein means that the computer is equipped with a combination of hardware and software for performing the tasks of the invention, as will be understood by those skilled in the art. Additionally, the measurement system 10 may further comprise a monitor 25, such as a LCD to display data.

Figure 3:
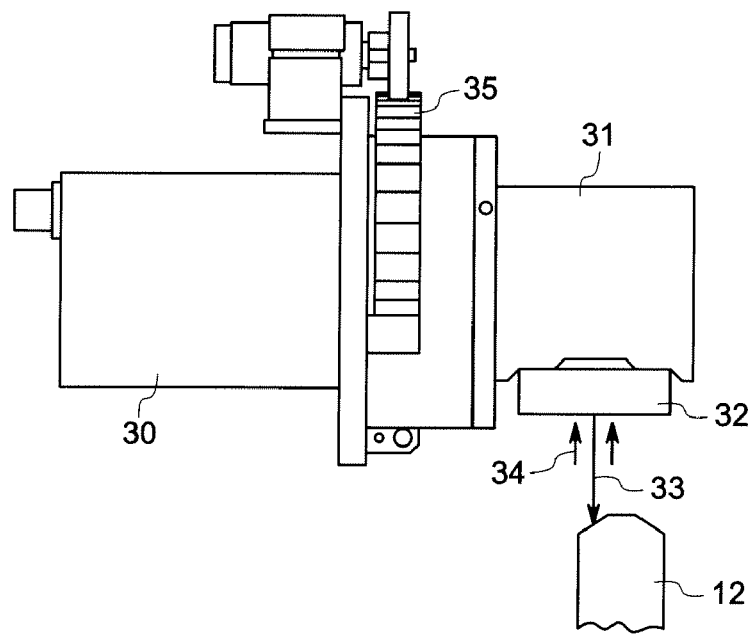
FIG. 3 is a schematic diagram of a range sensor of the measurement system in FIG. 2.

FIG. 3 illustrates a schematic diagram of an example the range sensor 23. In the illustrated example, the range sensor 23 comprises an optical sensor 30 and a periscope 31 coupled to the optical sensor 30. The optical sensor 30 comprises a conoscopic sensor, such as the Optimet Smart Probe described in U.S. Pat. No. 5,953,137. The periscope 31 further comprises a lens 32. Alternatively, the optical sensor 30 may be another suitable ranging sensor.

In the illustrated embodiment, a light source (not shown) generates and directs a beam of light 33, such as a laser with a wavelength of 670 nm on a point of the cutting tool 10 after the light 33 passes through the optical sensor 30 and the periscope 31 in turn. Then, a beam of reflected light 34 is generated because of diffusion of the light 33 on the point of the cutting tool 10. The diffused light 34 passes through the periscope 31 and is detected by the optical sensor 30. Subsequently, the controller 24 (shown in FIG. 2) retrieves a distance of the point on the cutting tool 10 from the optical sensor 30 and extracts the parameters of the point by analyzing information in the detected light 34, which is known to one skilled in the art. In one or more embodiments of the invention, with the rotation of the cutting tool 10, the optical sensor 30 may detect diffused light from different points on the cutting tool 10 so that the controller 24 extracts the parameters of the cutting tool 10.

In one embodiment, the controller 24 may determine the distance with an accuracy of approximately ±1.5 microns based on the information in the detected lights by the range sensor 23. In other embodiments, the controller 24 may determine the distance with other suitable accuracy. In the illustrated embodiment, the incident light 33 has a frequency of up to approximately 3000 kilohertz. Alternatively, the incidence light 33 may have another suitable frequency.

For the arrangement illustrated in FIG. 3, the range sensor 23 further comprises a rotation mechanism 35 coupled to the periscope 31. In one embodiment, the controller 24 may control the rotation mechanism 35 to rotate the periscope 31 within a range of approximately zero degree to approximately ninety degree, or other suitable ranges. Thus, in embodiments of the invention, the rotation mechanism 35 rotates the periscope 31 to enable the lens 32 to align with the points on the side portion 121 or the tip 122 (shown in FIG. 1) of the cutting body 12. In certain embodiments, the optical sensor 30 may also be rotatable.

As illustrated in FIGS. 1-3, during operation, the controller 24 controls the range sensor 23 and the first stage 220 holding the cutting tool 10 to move cooperatively so that the lens 32 first aims at a first desired section of the side portion 121 of the cutting body 12 with an appropriate distance therebetween. Then, the measurement system 20 rotates the cutting tool 10 while the light 33 scans along the first desired section with the rotation of the cutting tool 10. Meanwhile, the range sensor 23 detects the detected light 34 diffused from the first desired section and outputs the detected information in the light 34 to the controller 24 for analyzing to generate a first scanning point cloud of the first desired section of the cutting tool 10. In one embodiment, the controller 24 may adjust the power of the light source for subsequent scans based on the signal to noise ratio of the detected light 34.

Figure 4:
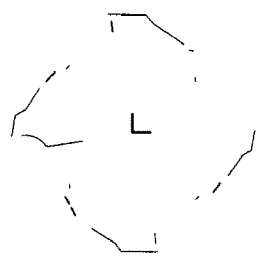
FIG. 4 is a schematic diagram useful for illustrating a first scanning point cloud of an object with some points absent.

In certain applications, the complex geometry of the cutting body 12 and limited working range of the range sensor 23 may cause the first scanning point cloud to miss some points of the first desired section. FIG. 4 shows a diagram useful for illustrating an exemplary first scanning point cloud of a section of an object (not shown) with some points absent. In other applications, the first scanning point cloud may include all points of the first desired section.

When missed points exist, the measurement system 20 further moves adaptively the cutting tool 10 to perform a subsequent scan to supplement the points absent based on the first scanning point cloud. In embodiments of the invention, the range sensor 23 has a focal length L, and works at a working range $L \pm T_0$, such as $L \pm 0.8$ mm to scan the different points on the side portion 121 of the cutting body 12.

In one embodiment, the controller 24 may employ predictive algorithms to supplement the absent points. That is, positions of the absent points may be determined based on positions of present points on the first scanning point cloud. In one example, firstly, selecting a present point $P_i$ proximate to an absent point $P_{i+1}$, such as an end point $P_i$ of a gap formed by the points absent, on the first scanning point cloud with a distance from the range sensor 23 being $X_i$. Thus, with the movement of the cutting body 12, the distance $X_i$ may be used for predicting a stage increment displacement ($X_{i+1}$) between the absent point $P_{i+1}$, and the range sensor 23. When the distance $X_{i+1}$, is in the range of $L \pm T_0$, and is larger or less than the distance L, the measurement system 20 moves the cutting tool 10 and/or the ranger sensor 23 to adjust the distance X i+1 to be proximate to the distance L so as to retrieve the position of the absent point $P_{i+1}$. Similarly, a next absent point $P_{i+2}$ may be retrieved based on the point $P_{i+1}$. Therefore, other absent points may be deduced by analogy. However, in this example, the system 20 may have to adjust the stage very frequently for every adjacent two positions have different sensor readouts, in other words, the $X_{i+1}$ is always different from $X_i$, which may cause vibration of the first stage 220.

In other examples, in order to avoid the vibration of the first stage 220, when the distance $X_{i+1}$, may be in a range of $L \pm T_1$ ($T_1 < T_0$), such as L±0.2 mm, the system 20 would retrieve this point without adjusting the position of the first stage 220. In embodiments of the invention, the points on the cutting body 12 with a distance within the working range of the range sensor 23 may be detected. However, in order to avoid adding too much inaccuracy to the first point cloud, the range of $L \pm T_1$ is selected based on experience. Additionally, when the distance $X_{i+1}$ is larger than $L \pm T_1$ and less than $L+T_0$, or larger than $L-T_0$ and less than $L-T_1$, the measurement system 20 adjusts the position of the first stage 220 to enable the distance $X_{i+1}$ to be in the range of $L \pm T_1$ for a scan. In one embodiment, the larger the distance $X_{i+1}$ is than $L+T_1$, the quicker the system 20 adjusts the first stage 220.

Thus, the positions of other absent points may be supplemented. In certain embodiments, distances of some points from the range sensor 23 may be beyond the working range of the range sensor 23, since without a compute aided design (CAD) model of the cutting tool 10 in the controller 24, the system 20 may not identify the actual location of the points. Consequently, these points may be still absent and may be retrieved in a second scan of the first section, which will be described below.

Figure 5A:
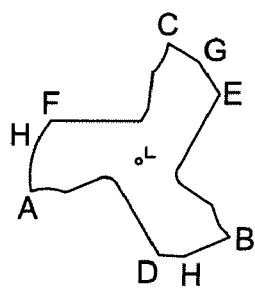
FIGS. 5(a)-5(b) are schematic diagrams useful for illustrating segmentation of a first scanning point cloud of an object.
Figure 5B:
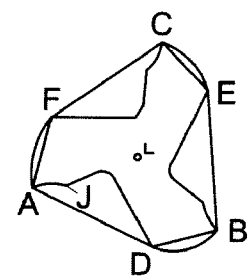

Subsequently, the controller 24 analyzes and segments the first scanning point cloud. FIGS. 5(a)-5(b) illustrates exemplary diagrams useful for illustrating segmentation of a first scanning point cloud of an object (not shown). For the example illustrated in FIG. 5(a), the controller 24 first analyzes a convex hull of the first scanning point cloud of the object to identify feature points thereon, such as edge points including the points A, B and C, and other feature points, such as the points D, E, F, G, H and I, which can be easily implemented by one skilled in the art. Then, the controller 24 calculates a distance of two adjacent feature points according to a certain order and compares the distance with a predetermined value therein. In one example, when the distance is larger than or equal to the predetermined value, the controller 24 would identify these points, such as the points A, D, B, E, C and F. Thus, a first segmentation of the first scanning point cloud is performed based on the segment of these feature points. For the example illustrated in FIG. 5(a), the first scanning point cloud is segmented into six segments based on the convex hull analysis.

As illustrated in FIG. 5(b), the controller 24 analyzes each segment in the first segmentation to perform a second segmentation. In one or more embodiments of the invention, every point in the first scanning point cloud has a normal perpendicular to a tangent of the point. Taking the point cloud in the segment AD as an example, that is, the controller 24 may analyze a normal of each point on the point cloud successively from the point A to the point D. When an angle between a normal of a point, such as the point J and the normal of the point A approximates or is equal to a predetermined angle, such as 80 degrees, the controller 24 defines the point cloud between the two points A and J as a scanning path. Similarly, the point cloud between A and D is segmented to different scanning paths. Thus, the second segmentation for the first scanning point cloud may be implemented.

Figure 6:
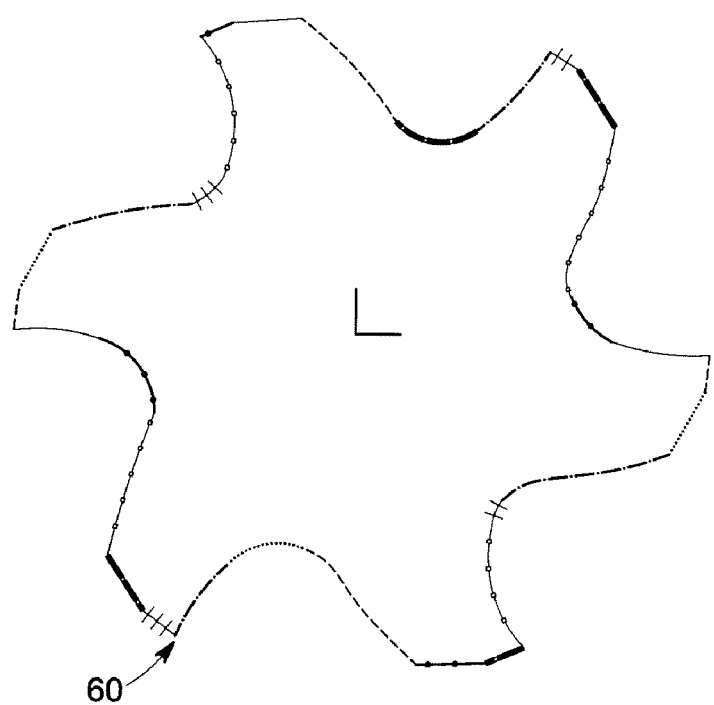
FIG. 6 is a schematic diagram of example scanning paths of a first scanning point cloud of an example cutting tool.
Figure 7:
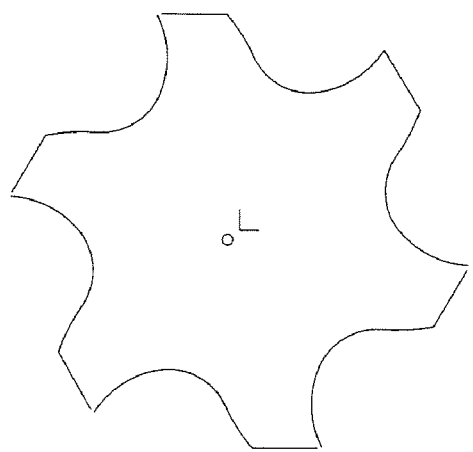
FIG. 7 is a second scanning diagram of the cutting tool shown in FIG. 6.

Similar to the first and second exemplary segmentations shown in FIGS. 4-5, and as illustrated in FIG. 6, the first scanning point cloud of the cutting tool 10 can be segmented into different scanning paths, which are illustrated by lines 60 with different symbols (in this example, the first scanning point cloud is segmented into 30 scanning paths). Then, the measurement system 20 performs a second scan to scan the first desired section of the side portion 121 of the cutting body 12 according to the different scanning paths in the second segmentation shown in FIG. 6 to retrieve a second scanning point cloud shown in FIG. 7 with higher accuracy than the first scanning point cloud. Meanwhile, the parameters on the first desired section are extracted.

In one embodiment, during the second scan, an incidence direction of the light 33 may be fixed. Therefore, the controller 24 may control the first stage 220 to first rotate, and then move the cutting tool 10 linearly to enable the lens 32 to face different portions of the first desired section according to the respective scanning paths of the second segmentation for scan. In other embodiments, the range sensor 23 may also rotate to change the incidence direction of the light 33 to cooperate with the first stage 220 holding the cutting tool 10.

In certain embodiments, with respect to the points absent from the first scan, during the second scan, the measurement system 20 may supplement these points by linearly scanning the gap formed by the absent points and/or by scanning the gap along extension lines of two end points of the gap. In one example, the extension lines of the two end points of the gap may be formed by connecting the two points with a central point O of the first scanning point cloud, respectively.

In some embodiments, the parameters of the side portion 121 of the cutting body 12 may also be extracted. In one example, firstly, the measurement system 20 controls the range sensor 23 and the first stage 220 holding the cutting tool 10 to move cooperatively so that the lens 32 faces a second desired section of the side portion 121 spaced away from the first section with a desired distance. Then, the first and second scans implemented on the first section may be used for scanning the second section to get a second scanning point cloud. Next, the measurement system 20 calculates a helix angle by analyzing the parameters of the first and second sections, and performs a side helical scanning according to the helix angle to get a side scanning point cloud of the side portion 121.

In other embodiments, after performing the side scanning, the measurement system 20 may move the range sensor 23 to align with the tip 122 of the cutting tool 10, and rotate the cutting tool 10 to scan the tip 122 to get a tip scanning point cloud. Thus, a 3D scanning point cloud (not shown) of the cutting tool 10 may be retrieved. Meanwhile, the parameters of the cutting tool 10 may be extracted and can be displayed on the monitor 25 for one to check whether the cutting tool 10 meet specifications.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

What is claimed is:

1. A method for measurement of a cutting tool, comprising:
positioning the cutting tool on a moveable stage;
using a range sensor to perform a first rotary scan of a first section of the cutting tool to generate a first scanning point cloud;
using a controller to segment the first scanning point cloud;
using the range sensor to perform a second rotary scan of the first section based on the segmentation of the first scanning point cloud; and
using the controller to extract the parameters of the first section based on the second rotary scan of the first section.

2. The method of claim 1, wherein the moveable stage moves linearly and rotates.

3. The method of claim 1, further comprising using the range sensor to perform a subsequent scan after the first rotary scan for supplementing points absent from the first rotary scan in the first scanning point cloud of the first section.

4. The method of claim 3, wherein the range sensor used to perform the subsequent scan has a focal length L and a working range of $L \pm T0$, and wherein distances of points on the first section from the range sensor are adjusted to be in a range of $L \pm T1$, and wherein T1 is less than T0 during the subsequent scan.

5. The method of claim 1, wherein the controller segments the first scanning point cloud of the first section by performing a first segmentation of the first scanning point cloud into a plurality of segments.

6. The method of claim 5, wherein the first segmentation is performed using a convex hull analysis of the first scanning point cloud.

7. The method of claim 5, wherein the controller segments the first scanning point cloud by further performing a second segmentation of one or more of the segments in the first segmentation into a plurality of scanning paths.

8. The method of claim 7, wherein the scanning paths of one of the segments are implemented by analyzing an angle of normals of two points on the respective segment.

9. The method of claim 7, wherein the second scan is performed along the different scanning paths.

10. The method of claim 1, further comprising:
using the range sensor to perform the first rotary scan of a second section of the cutting tool to generate a second scanning point cloud;
using the controller to segment the second scanning point cloud;
using the range sensor to perform the second rotary scan of the second section based on the segmentation of the second scanning point cloud; and
using the controller to extract the parameters of the second section based on the second rotary scan of the second section.

11. The method of claim 10, further comprising using the range sensor to perform the subsequent scan after the first rotary scan of the second section for supplementing points absent from the first rotary scan in the second scanning point cloud.

12. The method of claim 10, wherein the controller segments the second scanning point cloud of the second section by performing a first segmentation of the second scanning point cloud into a plurality of segments and performing a second segmentation of one or more of the segments in the first segmentation into a plurality of scanning paths.

13. The method of claim 10, further comprising using the controller to calculate a helix angle by analyzing the parameters extracted from the first and second section.

14. The method of claim 13, further comprising using the range sensor to perform a side scan of a side portion of the cutting tool according to the helix angle.

15. The method of claim 14, further comprising using the range sensor to rotatably perform a tip scan of a tip of the cutting tool.

16. A system for measurement of a cutting tool, comprising:
a stage configured to position the cutting tool;
a range sensor configured to scan the cutting tool; and
a controller configured to control the range sensor to perform a first rotary scan of a first section of the cutting tool to generate a first scanning point cloud and segment the first scanning point cloud, and further to control the range sensor to perform a second rotary scan of the first section based on the segmentation of the first scanning point cloud to extract the parameters of the first section.

17. The system of claim 16, wherein the stage comprises a first stage for holding the cutting tool and a second stage for holding the range sensor.

18. The system of claim 16, wherein the first stage moves linearly and rotates the cutting tool and the range sensor moves linearly on the second stage.

19. The system of claim 16, wherein the controller firstly segments the first scanning point cloud into a plurality of segments and then segments one or more of the segments into a plurality of scanning paths.

20. The system of claim 19, wherein the segments are performed based on a convex hull analysis of the first scanning point cloud, and wherein the scanning paths are implemented by analyzing an angle of normals of two points on the respective one of the segments.

* * * * *